United States Patent
Bringer et al.

(10) Patent No.: US 9,886,597 B2
(45) Date of Patent: Feb. 6, 2018

(54) METHOD FOR ENCODING DATA ON A CHIP CARD BY MEANS OF CONSTANT-WEIGHT CODES

(71) Applicant: MORPHO, Issy les Moulineaux (FR)

(72) Inventors: Julien Bringer, Issy les Moulineaux (FR); Victor Servant, Paris (FR)

(73) Assignee: MORPHO, Issy les Moulineaux (FR)

( * ) Notice: Subject to any disclaimer, the term of this patent is extended or adjusted under 35 U.S.C. 154(b) by 4 days.

(21) Appl. No.: 14/770,797

(22) PCT Filed: Jan. 17, 2014

(86) PCT No.: PCT/EP2014/050867
§ 371 (c)(1),
(2) Date: Aug. 26, 2015

(87) PCT Pub. No.: WO2014/131546
PCT Pub. Date: Sep. 4, 2014

(65) Prior Publication Data
US 2016/0012255 A1    Jan. 14, 2016

(30) Foreign Application Priority Data

Feb. 27, 2013  (FR) ...................................... 13 51712

(51) Int. Cl.
*G06F 21/75*     (2013.01)
*H03M 7/20*     (2006.01)
(Continued)

(52) U.S. Cl.
CPC .............. *G06F 21/75* (2013.01); *G06F 11/10* (2013.01); *G06K 19/07309* (2013.01);
(Continued)

(58) Field of Classification Search
CPC ........................................................ H04L 9/06
(Continued)

(56) References Cited

U.S. PATENT DOCUMENTS 4,776,011 A * 10/1988 Busby .................. H04L 9/0637
380/28
6,844,833 B2   1/2005 Cornelius et al.
(Continued)

FOREIGN PATENT DOCUMENTS

WO    WO-2004105304    12/2004
WO    WO-2010049276    5/2012

OTHER PUBLICATIONS

Poschmann, "Side-Channel Resistance Crypto for Less than 2300 GE", 2010, Journal of Cryptology, pp. 322-345.*
(Continued)

*Primary Examiner* — Taghi Arani
*Assistant Examiner* — Gregory Lane
(74) *Attorney, Agent, or Firm* — Blakely Sokoloff Taylor & Zafman LLP

(57) ABSTRACT

The invention relates to a data-processing method that includes encoding a plurality of data of n bits into code words having a predefined constant Hamming weight, characterized in that said method also includes using (4000) encryption operations or arithmetic operations on the resulting code word(s) and also in that encoding each datum includes: decomposing (100) the datum into a plurality of m bit sequences to be encoded, m strictly being less than n; encoding (300) each bit sequence into a partial code word, each having a predefined Hamming weight, such that the sum of the Hamming weights of the partial code words are equal to the Hamming weights of the code word; and concatenating (300) the partial code words such as to produce the code word corresponding to the datum. The invention also relates to a data transmission method and to an electronic circuit configured to implement said methods.

13 Claims, 2 Drawing Sheets

(51) Int. Cl.
*G06K 19/073* (2006.01)
*G06F 11/10* (2006.01)
*G09C 1/00* (2006.01)
*H04L 9/06* (2006.01)
*H04L 9/00* (2006.01)

(52) U.S. Cl.
CPC ............. *G09C 1/00* (2013.01); *H03M 7/20* (2013.01); *H04L 9/003* (2013.01); *H04L 9/004* (2013.01); *H04L 9/06* (2013.01); *H04L 2209/34* (2013.01)

(58) Field of Classification Search
USPC .......................................... 713/189; 380/252
See application file for complete search history.

(56) References Cited

U.S. PATENT DOCUMENTS

| | | | | | |
|---|---|---|---|---|---|
| 7,149,955 | B1* | 12/2006 | Sutardja | ............... | H03M 13/19 341/58 |
| 2002/0101986 | A1* | 8/2002 | Roelse | ............... | H04L 9/0618 380/42 |
| 2002/0154767 | A1* | 10/2002 | Endo | ............... | G06Q 20/341 380/28 |
| 2003/0044004 | A1* | 3/2003 | Blakley | ............... | G06F 7/72 380/28 |
| 2005/0240778 | A1* | 10/2005 | Saito | ............... | G06K 19/07354 713/186 |
| 2006/0007024 | A1* | 1/2006 | Tsang | ............... | G11B 20/1426 341/50 |
| 2007/0055868 | A1* | 3/2007 | Brier | ............... | H03M 13/05 713/162 |
| 2008/0212776 | A1 | 9/2008 | Motoyama | | |
| 2011/0025533 | A1* | 2/2011 | Abbasfar | ............... | H03M 5/145 341/63 |
| 2011/0091033 | A1* | 4/2011 | Michiels | ............... | H04L 9/304 380/28 |
| 2012/0072737 | A1* | 3/2012 | Schrijen | ............... | H04L 9/3278 713/189 |

OTHER PUBLICATIONS

French Search Report and Written Opinion, dated Jun. 28, 2013, French Application No. 1351712.
International Search Report and Written Opinion, dated Apr. 7, 2014, Application No. PCT/EP2014/050867.
Gyori, Sandor , "Signature Coding over Multiple Access OR Channel", *Information Theory Workshop*, (Mar. 31, 2003), 115-118.
Lin, Mao-Chao , "Constant Weight Codes for Correcting Symmetric Errors and Detecting Unidirectional Errors", *IEEE Transactions on Computers*, vol. 42, No. 11, (Nov. 1, 1993), 1294-1302.

* cited by examiner

METHOD FOR ENCODING DATA ON A CHIP CARD BY MEANS OF CONSTANT-WEIGHT CODES

FIELD OF THE INVENTION

The field of the invention is that of encryption of data on smart cards to secure their later use, especially in cryptography applications.

PRIOR ART

Many electronic components, such as for example smart cards, perform operations on secret data for calculation or comparison. Some applications of these operations are for example banking applications, applications for mobile telephony, etc.

Operations on secret data can be the focus of attacks to determine said secret data.

Some of these attacks, known as "side channels" or attacks on hidden channels, consist of studying the physical behaviour of the electronic component, especially in terms of electromagnetic leaks, or in terms of variations of electrical consumption, or response time.

Other attacks, qualified as attacks "by injection of errors" have also been developed, which consist of corruption of some data used during calculation performed by the electronic component to obtain secret data. These attacks comprise for example bombardment of the electronic component by laser or light, generation of electromagnetic parasite fields, injection of voltage peaks into the feed of the component, etc.

To counter these types of attacks, it has been proposed to add a random value to the secret data, decorrelating the data used from their original value. This method however is not completely effective because it is possible, from observation of several successive calculations, to retrieve the original secret datum.

Another proposition comprised encryption of secret data with codes called "of constant weight", that is, codes linking to each datum a code word having a constant predetermined Hamming weight. The Hamming weight of a series of bits is the number of bits at 1 of the series.

Because of this encryption, all data used have the same Hamming weight, which also renders constant the power consumption of the electronic component during use of said data (power consumption of the component depends in fact on the Hamming weight of data used). The component is therefore protected from side channels attacks.

Also, it is possible to detect an attack by injection of error if an encoded datum has a Hamming weight different to the predetermined Hamming weight.

However, encryption by constant weight codes does not currently allow implementation of operations on data encoded in a low-memory electronic component such as a smart card.

For example, encryption known as Dual Rail is known, which consists of encrypting a 0 by the combination 1-0 and a 1 by the combination 0-1. This method therefore doubles the size of the sequence of bits encoded relative to the initial datum, and performing operations on these encoded data is not possible on a smart card because it requires too much memory.

Similarly, patent FR2855286 discloses a method for data transmission encoded by means of constant weight codes, but this method disallows performing operations on the encoded data, because these operations would still need too much memory than would the memory available in a smart card.

PRESENTATION OF THE INVENTION

The aim of the invention is to rectify the disadvantages of the prior art mentioned hereinabove, by proposing a method for encryption data limiting the size of code words obtained to later perform calculations from said code words on an electronic component of smart card type.

Another aim of the invention is to provide a data encryption method to resist side channels attacks or detect attacks by injection of errors.

In this respect, the aim of the invention is a processing method for data comprising the encoding of a plurality of data of n bits in code words having a predefined constant Hamming weight,
the method being characterized in that it further comprises the implementation of the operations of encryption or arithmetical operations on the code word or the code words obtained, and in that the encoding of each datum comprises:
  decomposition of the datum into a plurality of m sequences of bits to be coded, m being strictly less than n,
  coding of each sequence of bits into a partial code word having each a predefined Hamming weight such that the sum of the Hamming weights of the partial code words is equal to the Hamming weight of the code word, and
  concatenation of partial code words to obtain the code word corresponding to the datum.

Advantageously, but optionally, the processing method according to the invention can also comprise at least one of the following characteristics:
  the size of the code word obtained is strictly less than 2n bits.
  the size n of the data is a power of 2 bits.
  the size of the sequences of bits is a power of 2 bits.
  the data comprise 4 bits, each datum being decomposed into a sequence of 3 bits, and a sequence of a bit, the first sequence being coded in a partial code word of 5 bits size and of Hamming weight equal to 2 or 3, and the remaining bit being coded in a partial code word of 2 bits size and of Hamming weight equal to 1.
  the data comprise 8 bits, the method comprising decomposition of each datum into two sequences of 4 bits, the two sequences of 4 bits being coded in two partial code words of 6 bits and of Hamming weight equal to 3.
  encoding is implemented by a first processing unit, the method further comprises the transmission to the second processing unit of at least one code word obtained from the datum or data, and the encryption operations or the arithmetical operations are implemented on said at least one code word by the second processing unit.
  the method further comprises verification, by the second processing unit, of the value of the Hamming weight of the code word received.
  the arithmetical operations or the encryption operations are implemented on at least one code word, and at output produce the coded result of the operation applied to the datum corresponding to the code word.
  the arithmetical operations or the encryption operations comprise linear operations applied to at least one code word, and the implementation of a linear operation comprises:

generation of at least one table taking at input at least one partial code word, and producing at output the result of the operation applied to the partial code word(s), decomposition of each code word on which the operation is implemented into partial code words, and calculation of the operation by application of partial code words to the tables, and concatenation of the results obtained.

the arithmetical operations or the encryption operations are non-linear, and the implementation of a non-linear operation comprises:

generation of at least one table taking at input at least one partial code word of at least one code word, and producing at output the result coded of the operation applied to at least one complete datum from which the partial code words are drawn, decomposition of each code word on which the operation is implemented into partial code words, and calculation of the operation by application of partial code words to the tables.

encryption operations or arithmetical operations of the processing steps of cryptographic algorithms, calculation algorithms of hashing functions, or integrity calculation algorithms adapted to receive said code words at input.

Another aim of the invention is an electronic circuit comprising:

an encoding module comprising a processing unit adapted to code data of n bits into code words having a predefined constant Hamming weight and for implementing on said code words encryption operations or arithmetical operations by the implementation of the processing method described hereinabove.

Advantageously, but optionally, the electronic circuit according to the invention can also comprise the following characteristics: the encoding module further comprises data transmission means, and the circuit further comprises:

a decoding module comprising a processing unit adapted to decode a code word transmitted by the first module, and an error signal generation module, adapted to generate an error signal when the Hamming weight of a code word transmitted by the first module is different to a predefined Hamming weight.

The final aim of the invention is a smart card comprising such an electronic circuit.

The proposed processing method comprises encoding of data into code words of sufficiently small size so that algorithms can be executed on said code words, even in low-memory computer units such as smart cards.

Also, the use constant weight codes secures data from side channels attacks such as attacks known as SPA, DPA, MIA, CPA, ASCA, because the power consumption of the smart card is the same for all data used.

Also, the use of constant weight codes allows detecting some attacks by injection of error such as especially attacks by laser pulse.

DESCRIPTION OF FIGURES

Other characteristics, aims and advantages of the present invention will emerge from the following detailed description, with respect to the appended figures, given by way of non-limiting examples and in which.

DETAILED DESCRIPTION OF AT LEAST ONE EMBODIMENT

Computer Unit for Encryption of Data

Figure 1:
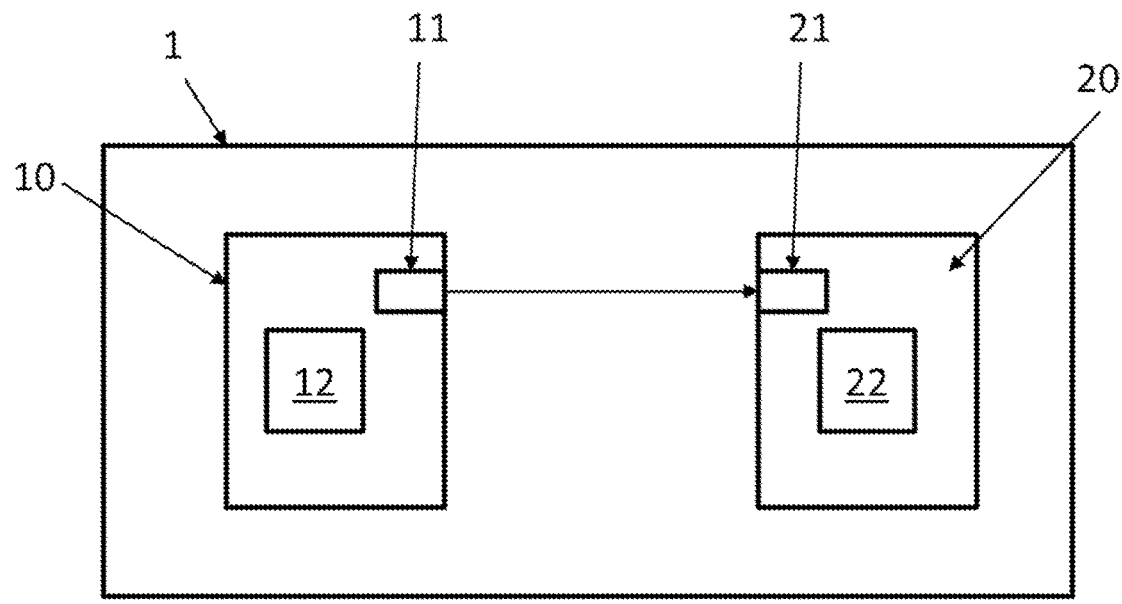
FIG. 1 schematically illustrates an example of an electronic component processing a datum or several secret data.

In reference to FIG. 1, an example of a computer unit is shown, that is able to encode data, including especially secret data, and to conduct operations from said data. This computer unit is advantageously a smart card 1, which comprises an electronic circuit comprising an encryption module 10 and a decoding module 20. Alternatively, the encoding module and the decoding module can belong to two separate computer units connected together to authorise communication of data.

The encoding module 10 is advantageously integrated into a processor of the smart card, and the decoding module can be integrated into a peripheral such as memory or a coprocessor of the smart card.

The encoding module 10 comprises data transmission means, for example a data communication bus 11, and a processing unit 12, adapted for implementing encryption and encoding operations on data, said unit being advantageously an arithmetic and logic unit (ALU). An arithmetic and logic unit is a circuit integrated into a processor for performing calculations on data.

The module 20 comprises data reception means 21 such as a data reception bus, as well as a processing unit 22 configured to decode data received from the encoding module, the unit being advantageously an arithmetic and logic unit 22.

Data Encryption Method

Figure 2:
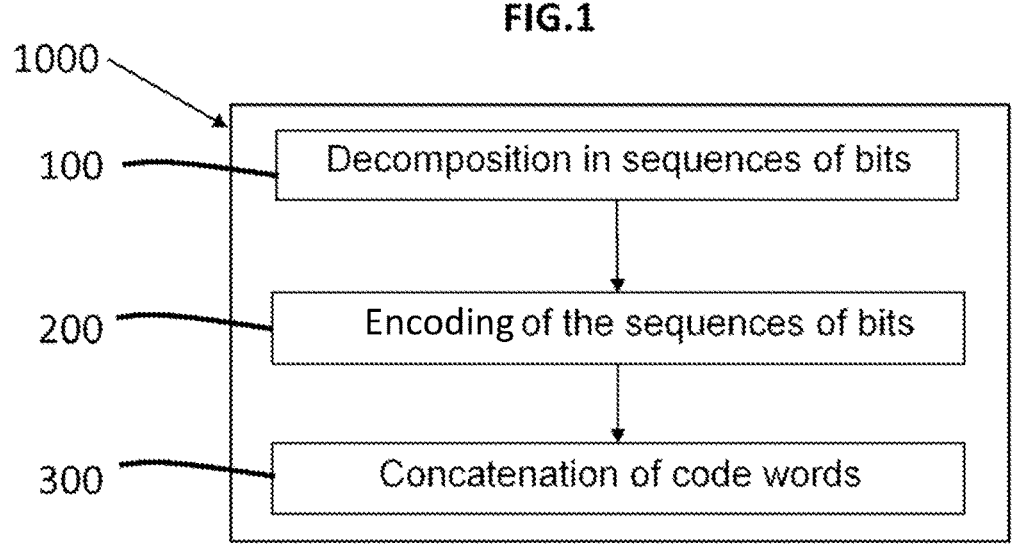
FIG. 2 illustrates the principal steps of an embodiment of an encryption method.

In reference to FIG. 2, the processing unit 12 of the encoding module 10 is adapted to encode a plurality of data, including especially secret data, so that these data are not obtained during their use by a side channels attack.

For a datum D of size equal to n bits, where n is a power of 2, the encoding method 1000 comprises a step 100 consisting of splitting the datum into several sequences of bits of size less than n, advantageously into m sequences of bits $d_1, \ldots, d_m$, m being strictly less than n. There is therefore at least one sequence of bits comprising at least two bits. This decomposition of the datum is a partition, that is, no bit of the datum is present in two sequences of bits.

This decomposition reduces the size of each sequence of bits for later calculation of binary operations having two operands such as for example the exclusive or.

Figure 3:
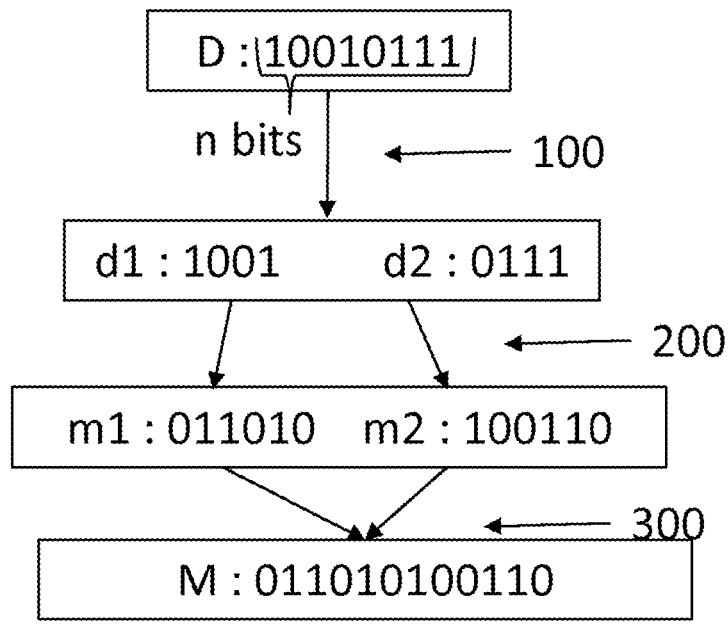
FIG. 3 illustrates an example of the implementation of the encryption method.

The sequences of bits obtained exhibit a size equal to a power of two bits. This creates a good compromise between the capacity for detection of errors and the memory occupied by the method. For example, FIG. 3 shows a datum D of a length of n=8 bits, split into two sequences of bits $d_1, d_2$ of 4 bits each.

According to another example, a datum of a length of n=4 bits is split into two sequences of 2 bits each.

During a step 200, the processing unit encodes the datum by means of a constant weight code to obtain a corresponding code word M, having constant and determined Hamming weight ω.

Hereinbelow, x,y-code is the function which transforms a datum into a datum of Hamming weight "x" on "y" bits. The entire image of this function therefore contains $$\binom{y}{x}$$

elements.

"$x_1,y_1$-$x_2,y_2$-code" is also the coding of a first part of a datum by a $x_1,y_1$-code and of its second part by a $x_2,y_2$-code.

The entire image of this function therefore contains $$\binom{y_1}{x_1} \times \binom{y_2}{x_2}$$

elements.

According to the above notation, to realise encoding of the datum the processing unit uses encoding of type $x_0,y_0$-$x_1,y_1$- . . . -$x_m,y_m$-code, where m>0 is the number of sequence of bits into which the datum has been decomposed. In other terms, the processing unit encodes during step 200, by means of constant weight coding, each sequence of bits $d_1, \ldots, d_m$ of the datum to form a corresponding partial code word $m_1, \ldots m_m$.

Referring again to the example of FIG. 3, the sequences of bits $d_1$, $d_2$ are encoded each by means of a 3,6-code to obtain respective code words $m_1$, $m_2$.

The code word M corresponding to the total datum D is the concatenation of partial code words $m_1, \ldots m_m$, realised by the processing unit during a step 300.

Highly advantageously, the sum of $y_m$, that is, lengths (in bits) of partial code words which correspond to the total length in bits of the code word obtained, is strictly less than 2n. This creates a shorter code word than especially in the Dual Rail method, making it simpler for implementing in a low-memory computer system such as a smart card.

Examples of preferred codes for the implementation of the method are also given; in the event where the size of the data D to be encrypted is 4 bits, a 3,5-1,2-code or a 2,5-1,2-code, is preferably used, with possible permutation of the first and of the second codes, that is to say that the datum D is decomposed into a sequence of 3 bits, then one bit. The first sequence being coded into a partial code word of 5 bits size and of Hamming weight equal to 2 or 3, and the remaining bit being coded in a partial code word of 2 bits size and of Hamming weight equal to 1.

In the event where the size of the data D to be encoded is 8 bits, a 3,6-3,6-code is preferably used, the datum D is decomposed into two sequences of bits of 4 bits, each being coded into a partial code word of 6 bits and of Hamming weight equal to 3, as in the example of FIG. 3.

The Data Processing Method

The data encoding method 1000 described hereinabove enables secure transmission of secret data from one module to another, for later use, for example during encryption operations.

It also executes encryption operations and/or arithmetical operations on the encrypted data, by processing units having low calculation capacities, such as smart cards.[2]

Figure 4:
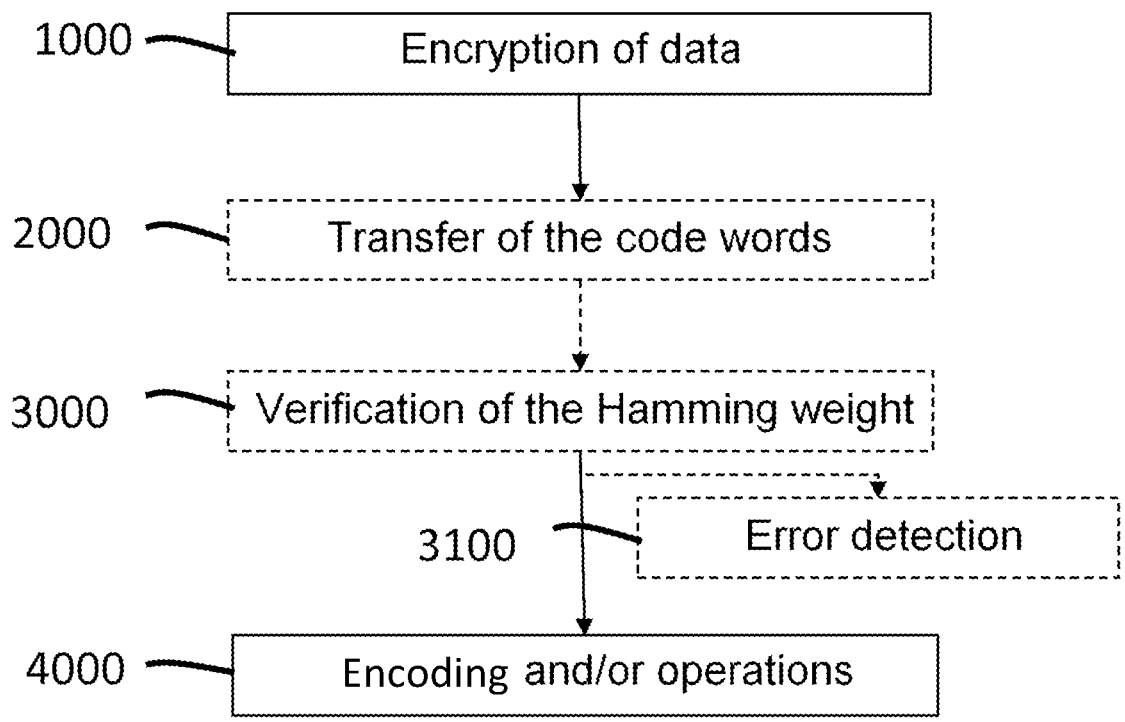
FIG. 4 illustrates the principal steps of an embodiment of a data processing method.

FIG. 4 illustrates a data-processing method comprising encoding, transmission, and later exploitation of transmitted data.

In the example of a smart card comprising an encoding module 10 and a decoding module 20 as illustrated in FIG. 1, a first data transmission step comprises encoding 1000 of said data by the processing unit 12 of the decoding module 20.

During a step 2000, the data communication bus 11 transfers to the receiving bus 21 of the decoding module 20 the code words obtained by encoding of data.

Advantageously, the smart card can also comprise an error signal generation module 30, which can be integrated into the decoding module (as illustrated in FIG. 1) or connected to the latter. Advantageously, but optionally, during a step 3000 this module 30 verifies that the Hamming weight of code words transmitted by the encoding module is equal to the Hamming constant weight ω which is agreed prior to the implementation of the transmission method.

If the Hamming weight of a code word differs from the Hamming weight ω, or if the received code word does not corresponds to the expected word (even though having the Hamming weight ω) the module 30 detects an error signal during a step 3100. The verification step of the Hamming weight especially allows detecting an attack by error injection, which would consequently modify the Hamming weight of the transmitted data.

If the Hamming weight complies with the expected weight, the processing unit 22 decodes the code words and/or exploits them for implementing an encryption operation or an arithmetic operation, for example of Boolean type, during a step 4000.

The results of arithmetical or encryption operations applied to the non-coded data can be obtained from code words generated from said data, as described hereinbelow.

Alternatively, decoding and/or exploitation 4000 of code words for the implementation of an encryption operation is carried out without previously verifying the exactness of the code words.

Alternatively, the encryption and/or the arithmetical operations 4000 can be carried out by the first processing unit without or prior to implementing a step 2000 for transmission of data to the second processing unit.

For example, an encryption operation can be a step of a cryptographic algorithm such as AES (for "Advanced Encryption Standard") or LED, of an algorithm of hashing function calculation such as for example SHA-1,SHA-2 or the future SHA-3, or even an algorithm for integrity calculation such as cyclic redundancy control (known as the acronym "CRC") or LRC (longitudinal redundancy check), such an algorithm having been previously adapted to receive as input the code words obtained by the method described hereinabove.

Several types of adaptations can be made as a function of the nature of operations executed in the algorithms.

In many algorithms, arithmetical operations are pre-calculated in the form of tables or truth tables.

In the event where encryption functions are non-linear functions, adaptation of the function to the code words consists of picking up the pre-calculated tables and adapting them to calculation by taking as inputs and outputs the values corresponding to the code words on which calculation is based. In other terms, at least one table is generated having as inputs the partial code words, on the basis of which calculation or the complete code word is done, and providing at output the coded result of the operation applied to the complete non-coded datum, which is the concatenation of sequences of bits from which the partial code words are drawn. The operation is therefore applied to all partial code words.

For example, a datum designated A comprises concatenation of two sequences of bits $a_0$, $a_1$ of respective sizes $L_0$ and $L_1$. B is a datum comprising the concatenation of two sequences of bits $b_0$, $b_1$, of respective sizes $L_0$ and $L_1$.

Noted are $A=a_1\|a_0$, and $B=b_1\|b_0$, where "$\|$" is the concatenation symbol.

Let $K_0$ be a code taking $L_0$ bits as input providing as output a code word of size $lk_0$ bits, and $K_1$ a code taking $L_1$ bits at input, and providing at output a code word of size $lk_1$ bits.

Noted are $CW(A)=K_1(a_1)\|K_0(a_0)$, and $CW(B)=(b_1)\|K_0(b_0)$, which are of size $lk_0+lk_1$ bits.

A first example of calculation of a non-linear operation is given for a function having a single operand. As this function is called "NLF", a table T_NLF is pre-calculated, giving: T_NLF [CW(A)]=CW (NLF (A)).

In other terms, T_NLF is a table taking at input a complete code word CW(A) and providing at output the code word obtained by identical encryption of the image of A by the function NLF.

A second example is given for calculation of a function having two operands, for example the addition modulo $2^{L0+L1}$.

Three defined tables are generated, as follows:

ADD-$K_0[K_0(a), K_0(b)]=K_0[(a+b)$ modulo $2^{L0}]$

This table takes at inputs two data coded by $K_0$, and produces at output the rest of the Euclidian division of the sum of two data by $2^{L0}$, coded by $K_0$.

REM-$K_0[K_0(a), K_0(b)]=K_1[(a+b)/2^{L0}]$

This table takes at inputs two data coded by $K_0$, and produces the quotient of the Euclidian division of the sum of two data by $2^{L0}$, coded by $K_1$, ADD-$K_1[K_1(a)\|K_1(b)]=K_1[(a+b)$ modulo $2^{L1}]$ This table takes at inputs two data coded by K1, and produces the rest of the Euclidian division of the sum of two data by $2^{L1}$, coded by K1.

Obtaining $CW(A+B$ modulo $2^{L0+L1})$ starting out from CW(A) and CW(B) will now be described.

$CW(A+B$ modulo $2^{L0+L1})$ is the encryption of A+B modulo $2^{L0+L1}$. By repeating the same notations as previously:

$$A+B=a_1\|a_0+b_1\|b_0=(a_1+b_1)\cdot 2^{L0}+a_0+b_0$$

This can be noted: $X\cdot 2^{L0+L1}+Y\cdot 2^{L0}+R_0$, therefore A+B mod $2^{L0+L1}$: $Y\cdot 2^{L0}+R_0$.

Where:

$R_0$ is the result of $a_0+b_0$ modulo $2^{L0}$, that is, the rest of the Euclidian division of $a_0+b_0$ by $2^{L0}$ X is the quotient of the Euclidian division of a+b by $2^{L0+L1}$ Y is the result of a+b modulo $2^{L0-L1}$, that is, the rest of the Euclidian division of a+b by $2^{L0+L1}$, which decomposes into $C_0+R_1$, where $C_0$ is the quotient of the Euclidian division of $a_1+b_1$ by $2^{L1}$, and $R_1$ is withholding of the addition $a_0+b_0$ modulo $2^{L0}$.

$CW(A+B$ modulo $2^{L0+L1})$ is therefore equal to $K_1(Y)+K_0(R_0)$. To obtain this from CW(A) and CW(B), the following are calculated with the tables introduced hereinabove:

$$K_0(R_0)=\text{ADD-}K_0[K_0(a_0),K_0(b_0)]$$

$$K_1(C_0)=\text{REM-}K_0[K_0(a_0),K_0(b_0)]$$

$$K_1(R_1)=\text{ADD-}K_1[K_1(a_1),K_1(b_1)]$$

$$K_1(Y)=\text{ADD-}K_1[C_0,R_1]$$

This gives $CW((A+B)$ modulo $2^{L0+L1})=K_1(Y)\|K_0(R_0)$.

In the event where encryption functions are linear functions, this adaptation step for exploitation or decoding of code words can for example be completed by decomposing the code word M into the partial code words $m_1, \ldots, m_m$ which compose them, and by performing the operation on each of the partial code words prior to concatenating the results obtained.

In the case of a function having several operands, each code word on which the operation is implemented is decomposed into its partial code words, and the operation is applied separately on the corresponding partial code words of each code word.

So for example, performing an operation of "exclusive or" (XOR) type on two encoded data comprises performing "exclusive or" operations on each partial code word.

With the same notation as previously, the function exclusive or applied to two concatenated data is designated XOR-$K_0$, coded by $K_0$, and which sends back their XOR in representation coded by $K_0$. Similarly with XOR-$K_1$ which applies to data coded by $K_1$ and sends back their XOR in representation coded by $K_1$.

$$\text{XOR-}K_0[K_0(a),K_0(b)]=K_0[a \text{ XOR } b]$$

The result of A XOR B in coded form is therefore calculated as follows:

$$R_0=\text{XOR-}K_0[K_0(a_0),K_0(b_0)]$$

$$R_1=\text{XOR-}K_1[K_1(a1),K_1(b_1)]$$

$$R=R_1\|R_0.$$

R is the same form as CW(A) and CW(B), that is, the concatenation of two code words coded respectively by $K_1$ and $K_0$.

In the present case, the pre-calculated tables present sizes adapted to those of partial code words used for arithmetical operations. By way of non-limiting example, for code words M of type 2,5-1,3-2,5-code, to be used for the implementation of an "or exclusive" operation, two tables of type "A XOR B" are precalculated, one for A and B of Hamming weight 2 on a size of 5 bits, and one for A and B of Hamming weight 1 on a size of 3 bits.

In the same way, if the processing unit intends to decode the code words, it separates each code word M into partial code words $m_1, \ldots, m_m$, and on each partial code word executes decoding corresponding to encoding used to obtain it. The decoding algorithm depends of course on the encoding algorithm used previously.

By way of non-limiting examples, other possibilities of encoding and decoding within the scope of the method described hereinabove are described hereinbelow.

According to a first example, the aim is to code data of a starting set E containing the whole numbers from 0 to 15, that is, the binary whole numbers represented on 4 bits.

The set of words of weight 3 from 6 bits is selected as input code, which is the following: {7, 11, 13, 14, 19, 21, 22, 25, 26, 28, 35, 37, 38, 41, 42, 44, 49, 50, 52, 56}. This set comprises 20 elements; it is therefore adapted to code the set E which contains 16. The set of the 16 first elements of the preceding code is designated J. In binary J=[111, 1011, 1101, 1110, 10011, 10101, 10110, 11001, 11010, 11100, 100011, 100101, 100110, 101001, 101010, 101100].

Associated with the element E[a] ("a-th" element of E) is the element J[a].

If the table J is saved in memory, this produces the coding method, which is a simple access to a table. A word "a" is coded by accessing in memory the value J[a].

For decoding, table K is created, of size $2^6$ elements (=64), which at placement J[i], i going from 0 to 15, will take the value of i.

This gives K[J[i]]=i, therefore decoding of the code word of "i" produces "i" itself. Table K is written as [X, X, X, X, X, X, X, 0, X, X, X, 1, X, 2, 3, X, X, X, X, 4, X, 5, 6, X, X, 7, 8, X, 9, X, X, X, X, X, X, 10, X, 11, 12, X, X, 13, 14, X, 15, X, X, X, X, X, X, X, X, X, X, X, X, X, X, X, X, X, X], where X is a value which is not in the starting set E.

For a word of 8 bits M to be coded, this word is split into two sequences of 4 bits each, each coded on 6 bits as described previously, then the partial code words obtained are concatenated.

For operations on the code word, a table is prepared which receives at input the partial code words and at output supplies the result of the operation applied to concatenation of the partial code words.

Other possibilities of encoding and decoding of data applicable within the scope of the present invention are known and are available to those skilled in the art.

The invention claimed is:

1. A data-processing method carried out in an electronic circuit in order to secure the electronic circuit against side channel attacks or detect attacks by injection of errors, comprising encoding a plurality of data (D) of n bits into code words (M) having a predefined constant Hamming weight,
further comprising encryption operations or arithmetical operations on the code word(s) obtained, and in that the encoding of each datum (D) comprises:
decomposition of the datum into a plurality of m sequences of bits ($d_1, \ldots, d_m$) to be coded, m being strictly less than n,
coding of each sequence of bits into a partial code word having each a predefined Hamming weight, such that a sum of the Hamming weights of the partial code words ($m_1, \ldots, m_m$) is equal to the Hamming weight of the code word (M), and concatenation of partial code words ($m_1, \ldots, m_m$) to obtain the code word (M) corresponding to the datum (D),
wherein the data (D) comprise 4 bits, each datum being decomposed into a first sequence of 3 bits, and a second sequence of one bit, the first sequence being coded in a partial code word of 5 bits size and of Hamming weight equal to 2 or 3, and the second sequence of one bit being coded in a partial code word of 2 bits size and Hamming weight equal to 1.

2. The data-processing processing method according to claim 1, wherein the code word obtained has a size strictly less than 2n bits.

3. The data-processing processing method according to claim 1, wherein the data (D) has a size n which is a power of 2 bits.

4. The data-processing processing method according to claim 1, wherein the sequences of bits ($d_1, \ldots, d_m$) have a size which is a power of 2 bits.

5. The data-processing method according to claim 1, the encoding being performed by a first processing unit, the method further comprising transmission to a second processing unit of at least one code word (M) obtained from the datum or data (D) and the encryption operations or the arithmetical operations being executed on said at least one code word (M) by the second processing unit.

6. The data-processing method according to claim 5, further comprising verification, by the second processing unit, of a value of the Hamming weight of the received code word.

7. The data-processing method according to claim 1, wherein the arithmetical operations or the encryption operations take carried out on at least one code word, and produces at output a result coded of the operation applied to the datum corresponding to the code word.

8. The data-processing method according to claim 1, wherein the arithmetical operations or the encryption operations comprise linear operations applied to at least one code word, and said linear operations comprise:
generation of at least one table taking at least one partial code word at input, and producing at output the result of the operation applied to the partial code word(s),
decomposition of each code word on which the operation is performed into partial code words, and
calculation of the operation by application of partial code words to the tables, and concatenation of the results obtained.

9. The data-processing method according to claim 1, wherein the arithmetical operations or the encryption operations are non-linear, wherein a non-linear operation comprises:
generation of at least one table taking at input at least one partial code word of at least one code word, and producing at output a coded result of the operation applied to at least one complete datum from which the partial code words are drawn,
decomposition of each code word on which the operation is performed into partial code words, and,
calculation of the operation by application of partial code words to the tables.

10. The data-processing method according to claim 1, wherein encryption operations or arithmetical operations are processing steps of cryptographic algorithms, calculation algorithms of hashing functions, or integrity calculation algorithms adapted to receive said code words at input.

11. An electronic circuit comprising an encoding module comprising a processing unit adapted to encrypt data of n bits into code words having a predefined constant Hamming weight and for implementing on said code words encryption operations or arithmetical operations 1,
wherein the encryption of each datum (D) comprises:
decomposition of the datum into a plurality of m sequences of bits to be coded, m being strictly less than n,
coding of each sequence of bits into a partial code word having each a predefined Hamming weight, such that a sum of the Hamming weights of the partial code words is equal to the Hamming weight of the code word (M), and concatenation of the partial code words to obtain the code word (M) corresponding to the datum (D),
wherein the data (D) comprise 4 bits, each datum being decomposed into a first sequence of 3 bits, and a second sequence of one bit, the first sequence being coded in a partial code word of 5 bits size and of Hamming weight equal to 2 or 3, and the second sequence of one bit being coded in a partial code word of 2 bits size and Hamming weight equal to 1.

12. The electronic circuit according to claim 11, wherein the encoding module further comprises data transmission means, and the circuit further comprises:
a decoding module comprising a processing unit adapted to decode a code word transmitted by a first module, and
an error signal generation module, adapted to generate an error signal when the Hamming weight of a code word transmitted by the first module is different to a predefined Hamming weight.

13. A smart card comprising an electronic circuit according to claim 11.

* * * * *